US012605931B2

(12) United States Patent
Horie

(10) Patent No.: US 12,605,931 B2
(45) Date of Patent: Apr. 21, 2026

(54) LIQUID DISCHARGING APPARATUS AND METHOD FOR MANUFACTURING THE SAME

(71) Applicant: CANON KABUSHIKI KAISHA, Tokyo (JP)

(72) Inventor: Asuka Horie, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 18/416,092

(22) Filed: Jan. 18, 2024

(65) Prior Publication Data

US 2024/0246338 A1 Jul. 25, 2024

(30) Foreign Application Priority Data

Jan. 19, 2023 (JP) ................................ 2023-006236

(51) Int. Cl.
*B41J 2/14* (2006.01)
*B41J 2/16* (2006.01)

(52) U.S. Cl.
CPC ......... *B41J 2/14274* (2013.01); *B41J 2/1612* (2013.01); *B41J 2/1623* (2013.01); *B41J 2002/14306* (2013.01); *B41J 2002/14491* (2013.01)

(58) Field of Classification Search
CPC .... B41J 2/14274; B41J 2/1612; B41J 2/1623; B41J 2002/14306; B41J 2002/14491; B41J 2/1607; B41J 2/14201
See application file for complete search history.

(56) References Cited

U.S. PATENT DOCUMENTS

2020/0001605 A1* 1/2020 Uyama ............... H01L 23/3157

FOREIGN PATENT DOCUMENTS

JP 2019206159 A 12/2019

* cited by examiner

*Primary Examiner* — Lisa Solomon
(74) *Attorney, Agent, or Firm* — Canon U.S.A., Inc. IP Division

(57) ABSTRACT

A liquid discharging head includes a discharge port, an electric wiring substrate, a first resin, a support member, and an element substrate having first and second surfaces, an energy generating element, and a terminal. The discharge port is provided on the first surface, and the terminal is provided on the second surface. When viewed from a direction perpendicular to the second surface, the element substrate includes a first region in which the discharge port is provided and a second region provided along one side of the element substrate and having a thickness thinner than that of the first region. The terminal is provided in the second region. The first resin covers a connection portion between the terminal and an electric wiring substrate. A second resin is disposed to be in contact with the first resin and the support member in a region overlapping the second region.

19 Claims, 11 Drawing Sheets

LIQUID DISCHARGING APPARATUS AND METHOD FOR MANUFACTURING THE SAME

BACKGROUND

Field

The present disclosure relates to a liquid discharging head and a method for manufacturing the same.

Description of the Related Art

In recent years, recording by an inkjet recording apparatus as a liquid discharging apparatus has been performed not only on a paper medium but also on a non-paper medium, such as a substrate, and high reliability as an industrial apparatus is required for the inkjet recording apparatus.

An inkjet head (liquid discharging head) provided in an inkjet recording apparatus includes an element substrate having a discharge port and an energy generating element which generates energy for discharging ink. The ink is discharged from the discharge port to the outside as ink droplets and lands on a medium, such as paper, to form an image or the like. The element substrate is provided with an electrical connection portion (electrode pad) to an electric wiring substrate for supplying electric power for driving the energy generating element from the outside. Japanese Patent Application Laid-Open No. 2019-206159 discloses a liquid discharge head having an element substrate and an electric connection member. The element substrate includes a discharge port, an energy generating element, and a terminal electrically connected to the energy generating element. The electric connection member is a member that is connected to the terminal and supplies an electric power for driving the energy generating element to the element from outside.

In some inkjet heads having an electrical connection portion, the electrical connection portion is sealed with a sealing member, such as a resin material, in order to prevent adhesion of ink. On the other hand, when ink droplets adhere to the vicinity of discharge ports and solidify, the recording quality may be impaired. Therefore, it is necessary to perform a cleaning operation of removing the adhering ink droplets by a blade-shaped member (blade member). In the cleaning operation, the blade member is moved while being pressed against the vicinity of the discharge ports of the element substrate, thereby removing the ink droplets. If the electrical connection portion is located on the surface of the element substrate on the discharge port side, since the sealing member for sealing the electrical connection portion has a protruding shape with respect to the element substrate, as a result, the blade member abuts against the sealing member of the electrical connection portion, which may affect the cleaning.

There are conventional inkjet heads in which a hole portion is formed in a region on the side opposite to the surface on which the discharge ports are provided (hereinafter referred to as the rear surface side of the element substrate), and an electrical connection portion is formed on the bottom surface of the hole.

In a case where the electrical connection portion of the conventional inkjet head is provided on the rear surface side of the element substrate and is electrically connected to the electric wiring substrate, the thickness of the element substrate in the hole portion is thinner than other portions. Therefore, the element substrate may be cracked or chipped due to a force applied during the cleaning operation of the inkjet head.

SUMMARY

The present disclosure is directed to providing a liquid discharging head in which the strength of an electrical connection portion of an element substrate is ensured.

According to an aspect of the present disclosure, a liquid discharging head includes an element substrate including a discharge port for discharging a liquid, an energy generating element for generating energy for discharging the liquid from the discharge port, and a terminal electrically connected to the energy generating element, wherein the discharge port is provided on a first surface of the element substrate, and the terminal is provided on a second surface of the element substrate opposite to the first surface, an electric wiring substrate connected to the terminal and configured to supply electric power for driving the energy generating element, a first resin covering a connection portion between the terminal and an electric wiring substrate, and a support member disposed adjacent to the element substrate on the second surface, wherein, when viewed from a direction perpendicular to the second surface, the element substrate includes a first region in which the discharge port is provided and a second region which is provided along one side of the element substrate and has a thickness in a direction perpendicular to the second surface thinner than that of the first region, wherein the terminal is provided in the second region, and wherein, when viewed from a direction perpendicular to the second surface, a second resin is disposed so as to be in contact with the first resin and the support member in a region overlapping the second region.

Further features of the present disclosure will become apparent from the following description of exemplary embodiments with reference to the attached drawings.

DESCRIPTION OF THE EMBODIMENTS

Hereinafter, a liquid discharging head and a method for manufacturing the liquid discharging head according to exemplary embodiments of the present disclosure will be described with reference to the drawings. However, the following description does not limit the scope of the present disclosure. As an example, in the exemplary embodiments, a piezoelectric method of discharging liquid by driving a piezoelectric element is adopted, but the present disclosure can also be applied to a liquid discharging head adopting a thermal method and other various liquid discharging methods.

In particular, the present disclosure can be suitably used in a piezoelectric liquid discharging unit using a piezoelectric element as an energy generating element. In the liquid discharging unit of the piezoelectric method, flow paths are individually provided as many as the number of discharge ports for discharging liquid droplets, and a piezoelectric element for generating pressure for discharging is attached to each of the individual flow paths. Accordingly, in order to arrange the discharge ports at a high density without changing the size of the printing element substrate, the number of piezoelectric elements needs to be increased, and the number of electrode terminals also needs to be increased. When the number of electrode terminals increases, a region of an electrical connection portion in the element substrate increases, and thus it is possible to suitably use the present disclosure that can secure the strength in the electrical connection portion between the printing element substrate and the electric wiring substrate.

The liquid discharging head of the present exemplary embodiment is a page-wide type head having a length corresponding to the width of a recording medium, but the present disclosure can also be applied to a serial type liquid discharging head that performs recording while scanning the recording medium. As the serial type liquid discharging head, for example, a configuration may be such that one element substrate for black ink and one element substrate for color ink are mounted. However, the present disclosure is not limited to this, and a liquid discharging head shorter than the width of the recording medium may be prepared by arranging several element substrates so that the discharge ports overlap in a discharge port array direction, and the liquid discharging head scans the recording medium.

Description of Liquid Discharging Head

Figure 1:
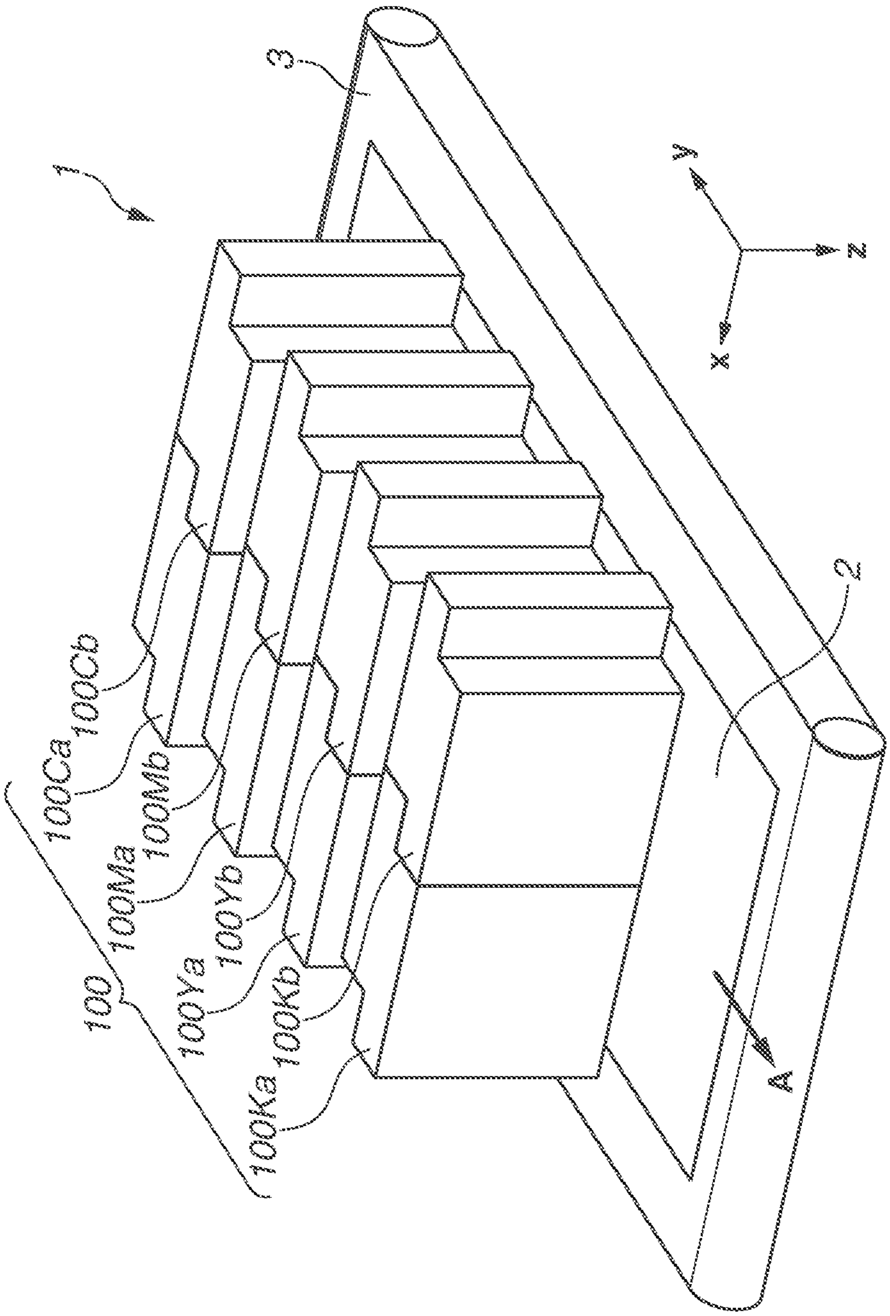
FIG. 1 is a perspective view of a liquid discharging apparatus according to exemplary embodiments of the present disclosure.

FIG. 1 shows a recording apparatus 1 including a liquid discharging head 100 having a length corresponding to the width of a recording medium 2. The recording medium 2 is conveyed in a direction of an arrow A (conveyance direction A) by a conveying unit 3, and recording is performed by the liquid discharging head 100. The liquid discharging head according to the present disclosure can be implemented in any form including the example of FIG. 1, and other forms are not limited. In the present specification, a direction parallel to and opposite to the conveyance direction A of the recording medium 2 is referred to as a Y direction, a direction from the liquid discharging head 100 toward the recording medium 2 is referred to as a Z direction, and a direction perpendicular to both the Y direction and the Z direction and perpendicular to the conveyance direction of the recording medium 2 is referred to as an X direction. The liquid discharging head 100 is a liquid discharging head in which a printing element substrate capable of discharging liquid is disposed on a support member. The liquid discharging head 100 is positioned in the recording apparatus 1 by a reference member. FIG. 1 illustrates the recording apparatus 1 including two liquid discharging heads 100 for each color, that is, eight liquid discharging heads 100 (100Ka, 100Kb, 100Ya, 100Yb, 100Ma, 100Mb, 100Ca, and 100Cb) in total, each of which can discharge ink of one of four colors of black (K), yellow (Y), magenta (M), and cyan (C).

Figure 2:
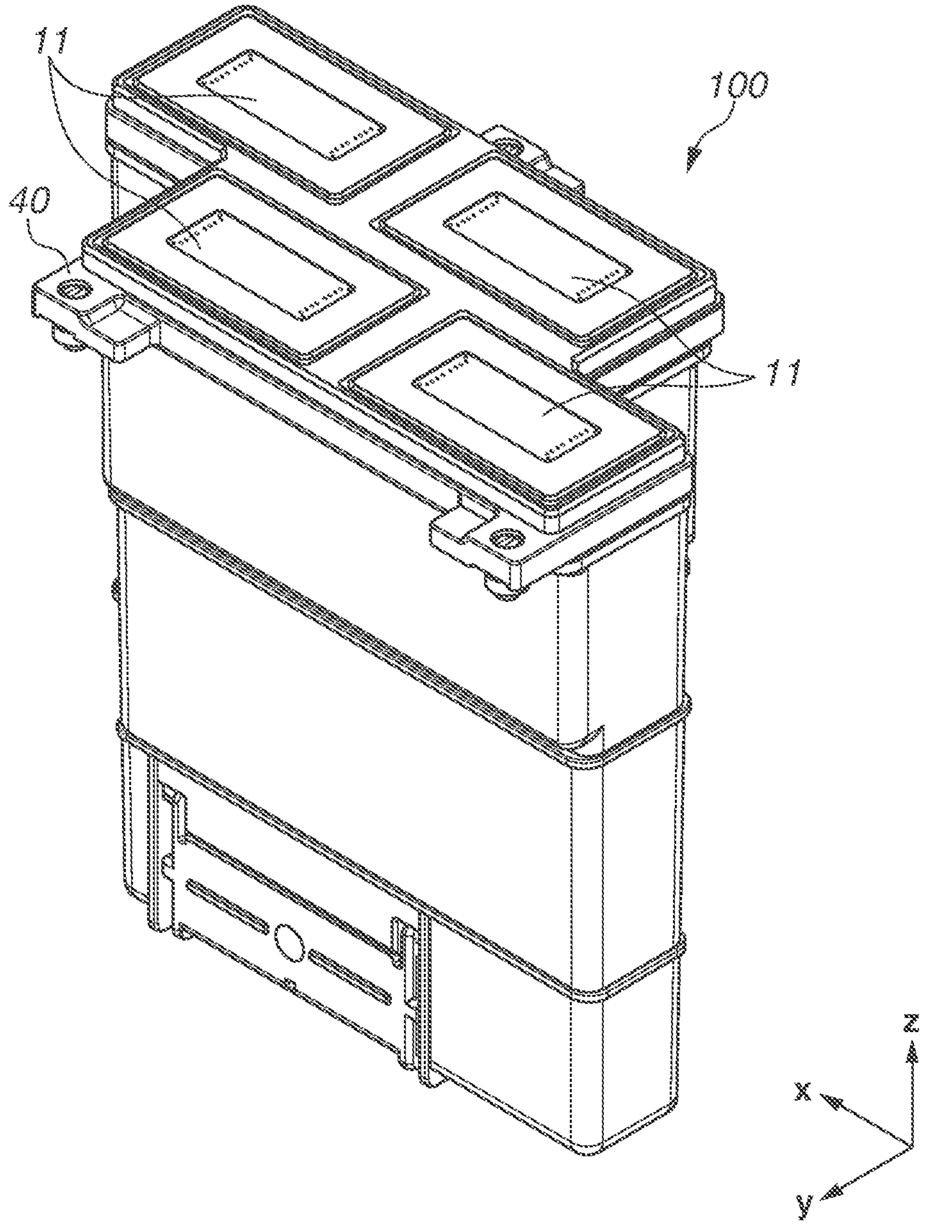
FIG. 2 is a perspective view of a liquid discharging head according to the exemplary embodiments of the present disclosure.
Figure 3:
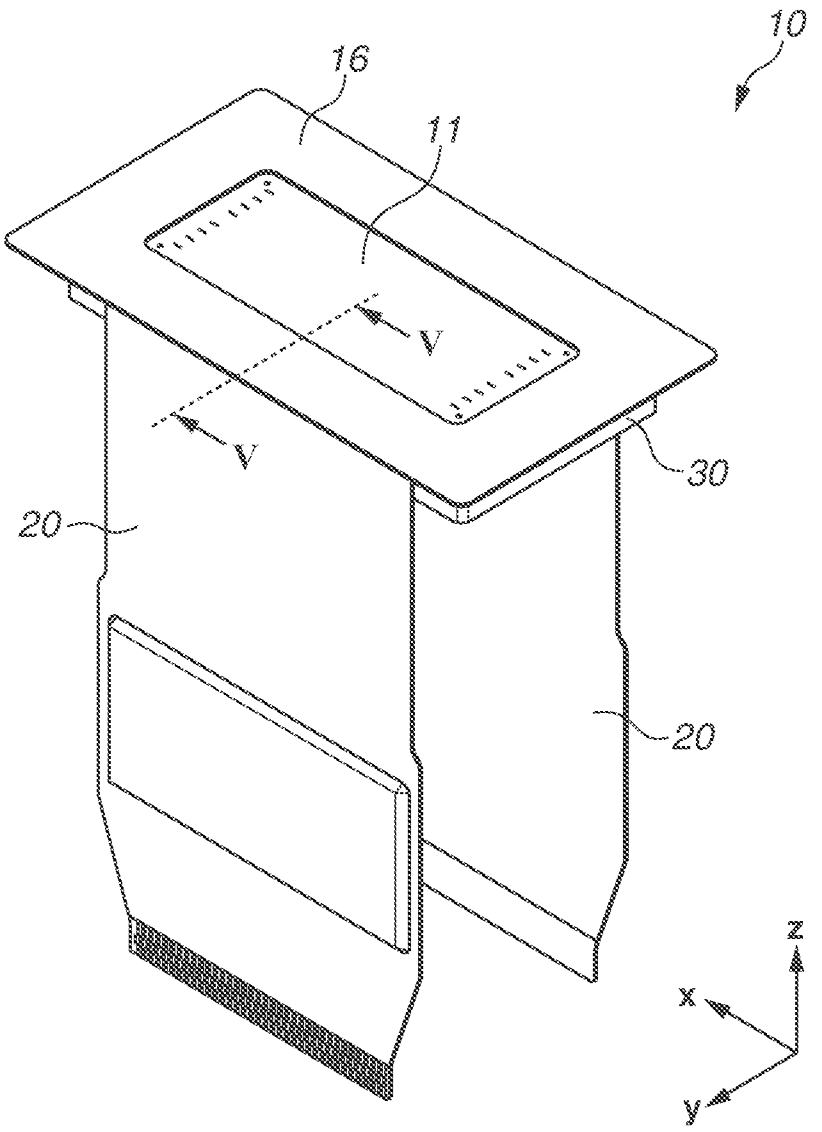
FIG. 3 is a perspective view of an element substrate unit according to the exemplary embodiments of the present disclosure.

FIG. 2 is a perspective view of the liquid discharging head 100, and FIG. 3 is a perspective view of the element substrate unit 10. In the liquid discharging head 100 according to the present exemplary embodiment, a plurality of element substrate units 10 each including an element substrate 11 having a discharge port for discharging liquid is fixed to a support member 40 (also referred to as a base member). The present disclosure can be suitably used even in a liquid discharging head having a configuration in which only one element substrate unit 10 is fixed to one support member. The liquid discharging head 100 includes a cover member 16 on a surface of the element substrate 11 on the side opposite to the support member 40. The liquid discharging head 100 further includes a housing that houses an electric wiring member and the like described below.

Figure 4B:
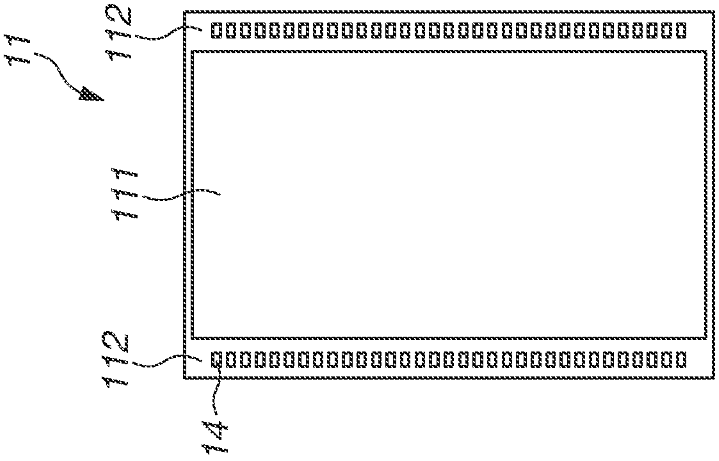
FIG. 4B is a plan view of the element substrate.
Figure 4A:
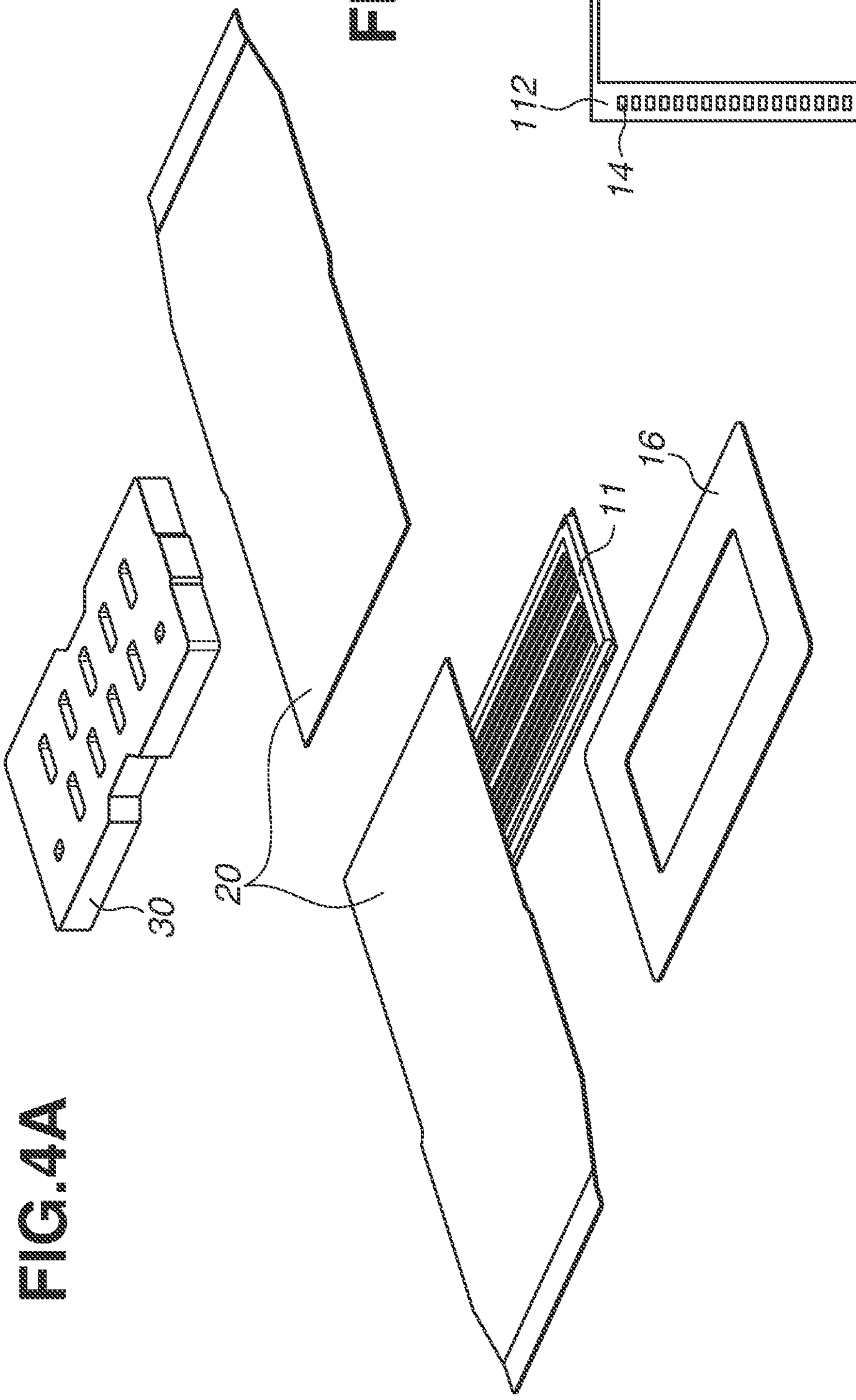
FIG. 4A is an exploded perspective view of the element substrate unit according to the exemplary embodiments of the present disclosure.
Figure 5:
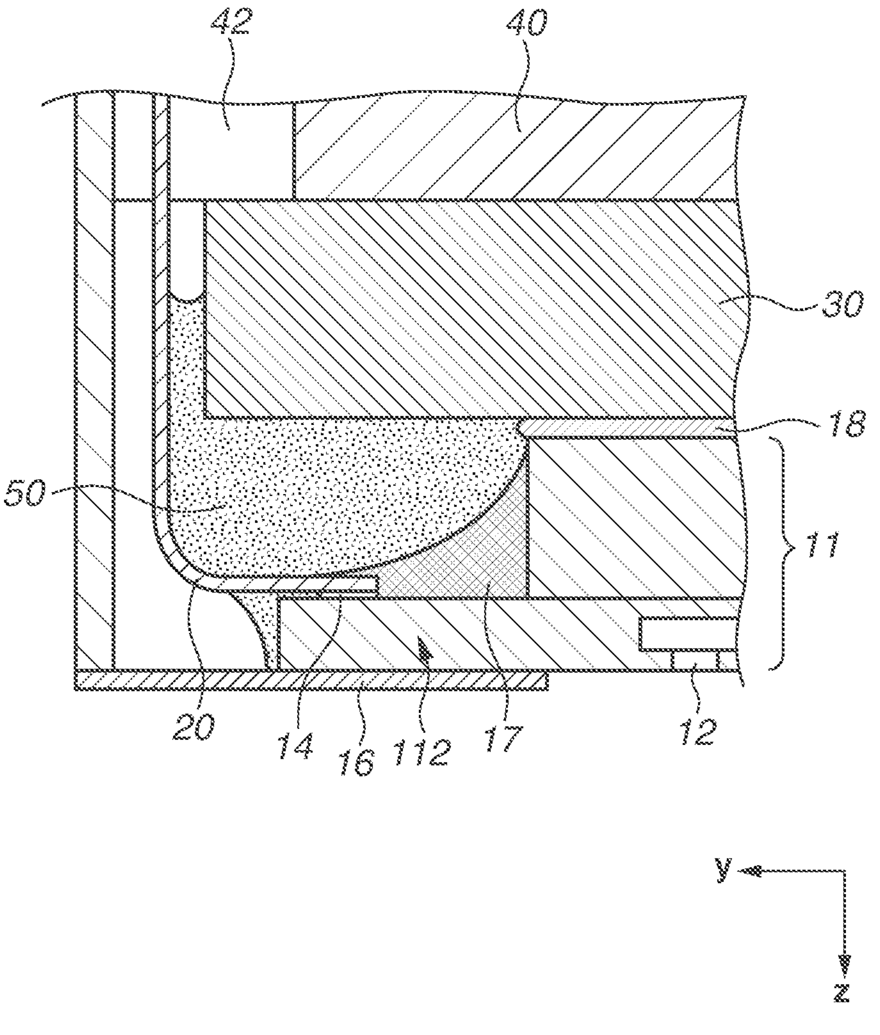
FIG. 5 is a cross-sectional view of a liquid discharging head according to a first exemplary embodiment of the present disclosure.

FIG. 4A is an exploded perspective view of the element substrate unit 10 viewed from a side opposite to a surface (also referred to as a front surface or a first surface) of the element substrate 11 on which discharge ports 12 are provided, and FIG. 5 shows a cross-sectional view of the liquid discharging head 100 taken along a line V-V in FIG. 3. The element substrate unit 10 includes the element substrate 11 including the discharge ports 12 for discharging liquid, energy generating elements (not shown) for generating energy for discharging liquid from the discharge ports 12, and terminals 14 electrically connected to the energy generating elements, an electric wiring member 20 connected to the terminals 14 and supplying electric power for driving the energy generating elements to the energy generating elements from the outside of the element substrate, and a flow path member 30 having a flow path for supplying liquid to the discharge ports 12 and disposed adjacent to the element substrate 11 on a rear surface (second surface) opposite to the front surface of the element substrate 11. The flow path member 30 is also a support member that supports the element substrate 11. As shown in FIGS. 4A and 4B, the electric wiring member 20 is connected to the terminals 14 of the element substrate 11 on the rear surface side of the element substrate 11 to form the electrical connecting portion. In the present exemplary embodiment, the element substrate unit 10 further includes a cover member 16 for protecting the front surface of the element substrate 11. In the present exemplary embodiment, as an example, alumina is used for the flow path member 30, and titanium is used for the cover member 16.

As shown in FIG. 4B, in the present exemplary embodiment, the terminals 14 are arranged at an end portion along a side of the element substrate 11. Accordingly, since it is possible to draw out electric wiring from both ends of the element substrate, it is possible to increase the number of terminals which can be mounted on one element substrate. As a result, the density of the discharge ports in the element substrate can be increased. In the present exemplary embodiment, the terminals 14 are arranged along the two long sides of the element substrate 11 and are connected to the electric wiring member 20. The present disclosure can be suitably used even in a case where the terminals are arranged along the short sides of the element substrate or in a case where the terminals are arranged along only one side of the element substrate.

FIG. 5 is a cross-sectional view of the liquid discharging head 100 taken along the line V-V in FIG. 3. Each of the terminals 14 is provided on the rear surface side of the element substrate 11, and the terminal 14 and one end portion of the electric wiring member 20 are electrically connected to each other. In the present exemplary embodiment, a flexible printed circuit (FPC) is used as the electric wiring member 20. However, a flexible flat cable or the like can be freely selected as long as it is a flexible member. The electrical connection portion between the terminal 14 and the electric wiring member 20 is covered with a sealing material (first resin) 17 made of resin. The element substrate unit 10 having the above-described configuration is disposed on the support member 40 in a state where the electric wiring member 20 is bent as illustrated in FIG. 5.

In the liquid discharging head of the present disclosure, the terminals 14, via which the element substrate 11 is electrically connected to the electric wiring member 20, are disposed on the rear surface opposite to the front surface on which the discharge ports 12 are provided. This prevents liquid, such as ink, adhering to the periphery of the discharge ports 12 from coming into contact with the terminals 14, and an effect of improving the electrical reliability of the liquid discharging head is obtained.

In the element substrate 11, an electric circuit including the energy generating element is formed in substantially the same plane as the terminals 14 of the element substrate 11 (not illustrated). Accordingly, compared to a case where the terminals 14 are disposed on a surface of the element substrate 11 that is connected to the flow path member 30, it is possible to obtain an effect of shortening the length of the electric wiring in the element substrate 11. The element substrate 11 having the above-described configuration can be easily formed by bonding a plurality of substrates to each other as illustrated in FIG. 5.

However, the element substrate 11 is not limited to the structure in which two substrates are bonded to each other as illustrated in FIG. 5, and may be formed of a single substrate or may have a laminated structure in which three or more substrates are bonded to each other.

In connecting the electric wiring member 20 to the rear surface of the element substrate 11, the element substrate 11 includes a second region 112 which is provided along one side of the element substrate 11 and has a thickness in a direction perpendicular to the surface of the substrate thinner than that of other regions (first region 111), and the terminals 14 are provided on the rear surface of the second region 112. FIG. 4B is a plan view of the element substrate 11 as viewed from the rear surface side. In FIG. 4B, an opening for allowing the element substrate 11 to be in fluid communication with the flow path of the flow path member 30 is not illustrated. Since the element substrate 11 has the terminals 14 in the second region 112 with respect to the first region 111, even when the flow path member 30 is disposed on the rear surface of the element substrate 11, the terminals 14 of the element substrate 11 are exposed in a space surrounded by the flow path member 30 and the element substrate 11. Thus, the electric wiring member 20 can be connected to the rear surface side at the end portion of the element substrate 11.

In the present exemplary embodiment, the element substrate 11 has the second region 112, whereby the terminals 14 are exposed. However, the present disclosure can be suitably used even in a liquid discharging head in which the terminals 14 arranged on the rear surface of the element substrate 11 are exposed by providing a recessed portion in a region of the flow path member 30 facing the terminals 14.

As described above, the liquid discharging head of the present exemplary embodiment has a region (the second region 112) having a thickness thinner than that of the other region (the first region 111) at the end portion of the element substrate 11. Therefore, when stress is applied from the front surface side of the element substrate 11, there is a concern that cracking or chipping may occur in the end portion of the element substrate 11. For example, a case is considered in which the stress is applied to the end portion of the element substrate 11 via the cover member 16 and cracking or chipping occurs, due to a cleaning operation of removing liquid droplets adhering to the surface of the liquid discharging head 100 on the cover member 16 side using a blade-shaped member or performing suction of the discharge port 12 by bringing a cap member into contact therewith.

Therefore, as shown in FIG. 5, in the liquid discharging head 100 of the present disclosure, a resin member (second resin) 50 is disposed so as to be in contact with each of the second region 112 of the element substrate 11, the flow path member 30, and the electric wiring member 20. Accordingly, since the flow path member 30 can receive the stress applied to the end portion of the element substrate 11 via the resin member 50, it is possible to obtain an effect of preventing cracking or chipping in the vicinity of the second region 112 in which the terminals 14 of the element substrate 11 are formed. Since the electrical connection portion between the terminals 14 and the electric wiring member 20 is covered with the sealing material 17, in a case where the entire rear surface of the second region 112 is covered with the sealing material 17, the resin member 50 and the sealing material 17 may be collectively regarded as the resin material in the present disclosure. That is, when the resin member 50 is disposed so as to be in contact with each of the second region 112, the flow path member 30, and the electric wiring member 20, the sealing material 17 may be interposed therebetween.

In order to improve a reinforcing effect in the second region 112 of the element substrate 11, it is preferable that a contact area between the resin member 50 and the second region 112 and a contact area between the resin member 50 and the flow path member 30 are large. Therefore, it is preferable that the resin member 50 is filled to a height equal to or higher than a height of a bonding surface between the flow path member 30 and the element substrate 11 in a state where the element substrate unit 10 is set such that the front surface of the element substrate 11 faces vertically downward.

Method of Manufacturing Liquid Discharging Head

Hereinafter, a method of manufacturing the liquid discharging head 100 of the present disclosure will be described.

Figure 6A:
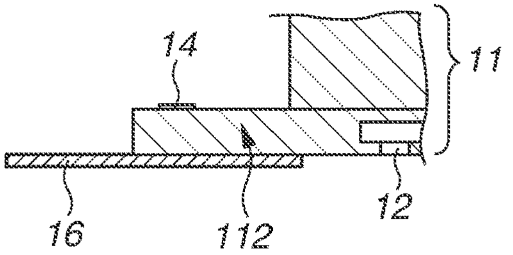
FIGS. 6A to 6G are cross-sectional views illustrating a part of a manufacturing process of a liquid discharging head of a comparative example.

First, as illustrated in FIG. 6A, the element substrate 11 including the discharge port 12, the energy generating element, the second region 112 having an end portion recessed along a side on the rear surface side opposite to the surface having the discharge port 12, and the terminals 14 provided on the rear surface of the second region 112 and electrically connected to the energy generating elements is prepared.

Next, as shown in FIG. 6A, a cover member 16 for protecting the front surface of the element substrate 11 is bonded to the element substrate 11. The bonding can be performed by appropriately using an adhesive, an adhesive seal, or the like, and in the present exemplary embodiment, an epoxy-based thermosetting adhesive is used.

Figure 6B:
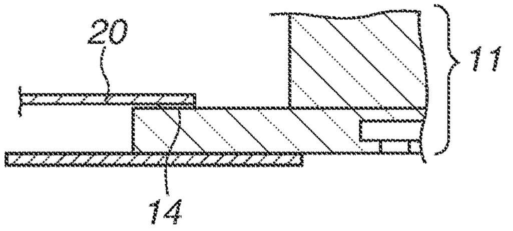

Next, as shown in FIG. 6B, the terminals 14 on the element substrate 11 and the electric wiring member 20 are electrically connected. As an electrical connection method, wire bonding, inner lead bonding (ILB), bonding using a non-conductive paste (NCP), or the like can be used as appropriate. In the present exemplary embodiment, the electrical connection is made by using NCP bonding. The NCP bonding can easily perform electrical connection compared to wire connection even when the pitch of the terminals 14 is small, and thus can be suitably used particularly in a case where the number of terminals on the element substrate is large, that is, the discharge port density is high.

Figure 6C:
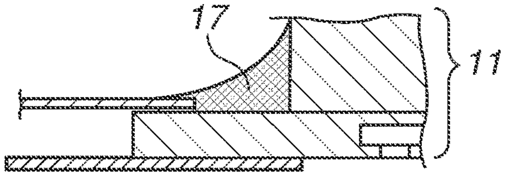

Next, as illustrated in FIG. 6C, the sealing material 17 is applied over the electrical connection portion and cured to protect the electrical connection portion. As the sealing material 17, epoxy resin, acrylic resin, epoxy acrylate resin, imide resin, amide resin, and the like can be used. The sealing material 17 may be cured by any of two-component mix curing, thermal curing by heating, ultraviolet (UV) curing by UV irradiation, and the like. In the present exemplary embodiment, a thermosetting epoxy resin having a viscosity of 10 Pa·s is used, and the sealing material 17 is applied onto the terminals 14 by a dispenser and then cured under a temperature condition of 100° C.

Figure 6D:
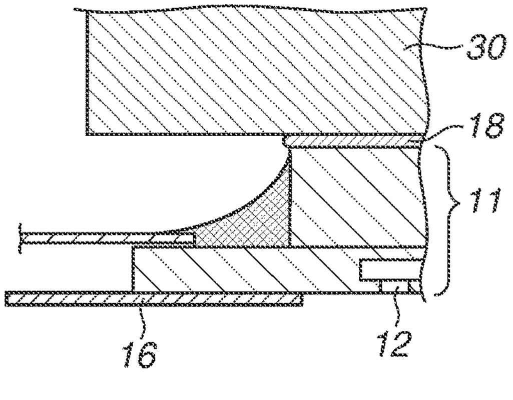

Subsequently, as illustrated in FIG. 6D, the flow path member 30 is bonded to the rear surface of the element substrate 11 using an adhesive 18.

Figure 6E:
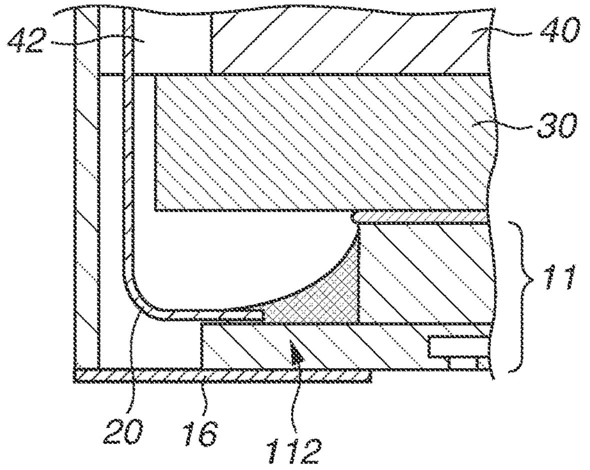

As illustrated in FIG. 6E, the element substrate units 10 configured as described above are arranged and fixed on the support member 40 in a state where the electric wiring member 20 is bent (see FIG. 2).

Figure 6F:
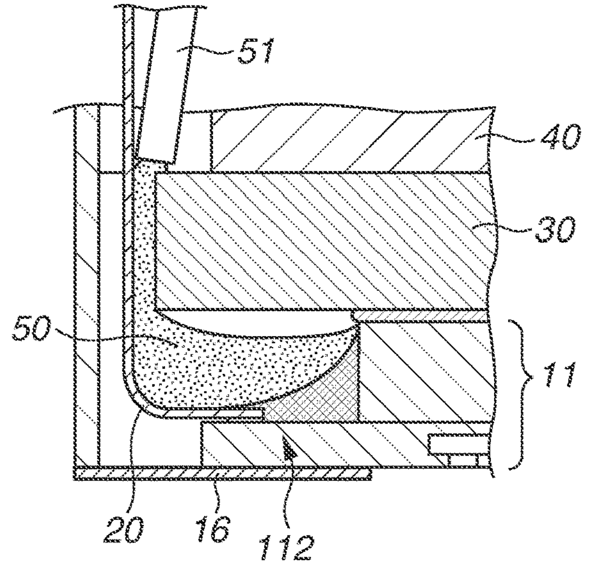
Figure 6G:
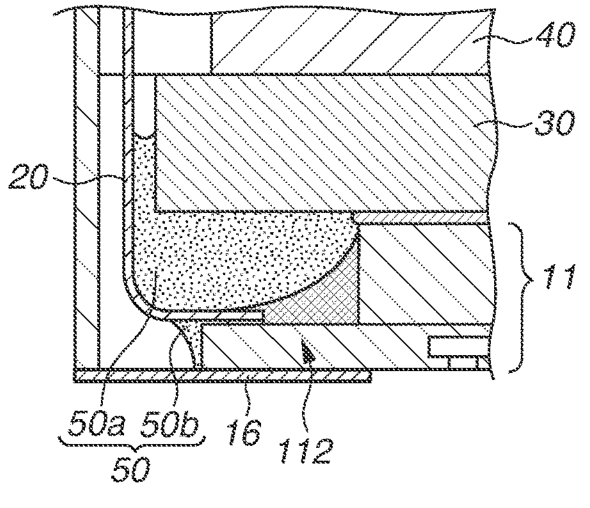

Next, as shown in FIG. 6F, a needle 51 is inserted between the electric wiring member 20 and the support member 40, and the resin member 50 fills a space (hereinafter, also referred to as a space R) surrounded by the second region 112 of the element substrate 11, the flow path member 30, and the electric wiring member 20. The resin member 50 injected from the needle 51 flows in the space R in the front-rear direction of the drawing surface of FIG. 6G, and fills the space R so as to contact all of the second region 112, the flow path member 30, and the electric wiring member 20 (a resin member 50*a* in FIG. 6G). A part of the resin member 50 mayleak out from the space R and be disposed so as to contact each of the electric wiring member 20, an end surface of the element substrate 11 (the end surface of the element substrate 11 in the second region 112), and the cover member 16 (a resin member 50*b* in FIG. 6G). In this case, an effect of improving the reinforcing effect in the second region 112 of the element substrate 11 is obtained. In addition, the strength of the electrical connection portion between the electric wiring member 20 and the terminals 14 is improved, and the electrical reliability is improved.

In the present exemplary embodiment, a moisture-curable silicone resin is used as the resin member 50. The resin member is desirably a moisture-curable resin, and thus, even in the space R surrounded by the element substrate 11, the flow path member 30, and the electric wiring member 20, it is easy to sufficiently cure the resin member 50. Although a thermosetting resin can be used, in this case, there is a concern that stress is applied to the element substrate 11 or the fixing position of the element substrate unit 10 to the support member 40 is shifted due to linear expansion or curing shrinkage by heating.

The viscosity of the resin member 50 at the time of filling (at the time of placement) is preferably 10 Pa·s or less. Since the resin member 50 has fluidity with low viscosity, the resin member 50 can naturally flow into the entire space R by capillary action. In the present exemplary embodiment, a silicone resin having a viscosity of 0.4 Pa·s to 2 Pa·s at the time of filling was used.

As described above, in order to improve the reinforcing effect in the second region 112 of the element substrate 11, it is preferable that the resin member 50 fills the space R to exceed the height of the bonding surface between the flow path member 30 and the element substrate 11 in a state where the element substrate 11 of the element substrate unit 10 is directed vertically downward. In this case, it is possible to confirm that the resin member 50 has sufficiently filled the space R from a through hole 42 of the support member 40, which is preferable in terms of manufacturing.

After the filling with the resin member 50, the resin member 50 was cured to complete the liquid discharging head 100. In the present exemplary embodiment in which the moisture-curable silicone resin is used as the resin member 50, the resin member 50 is left for 12 hours to be sufficiently cured.

Figure 7A:
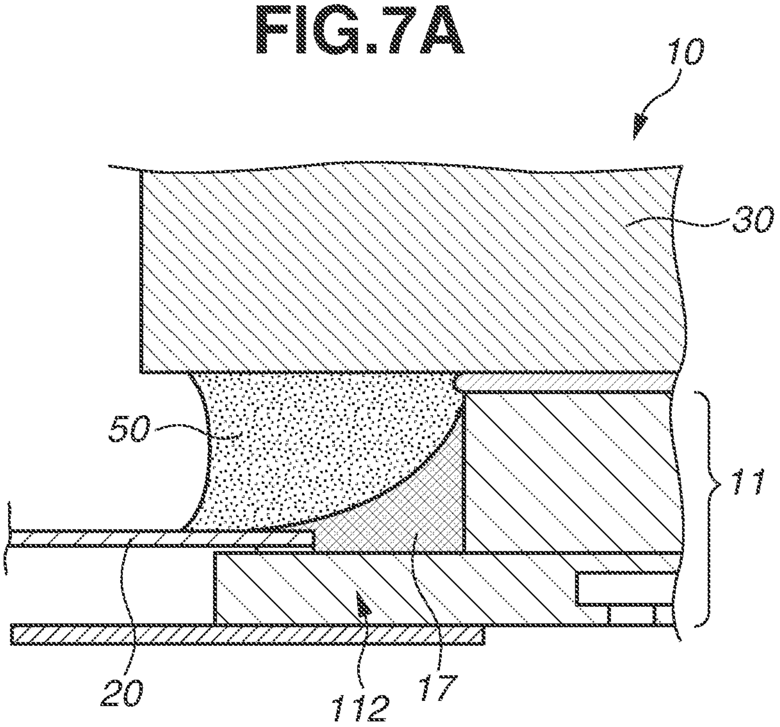
FIGS. 7A and 7B are cross-sectional views illustrating a part of a manufacturing process of the liquid discharging head according to the first exemplary embodiment of the present disclosure.
Figure 7B:
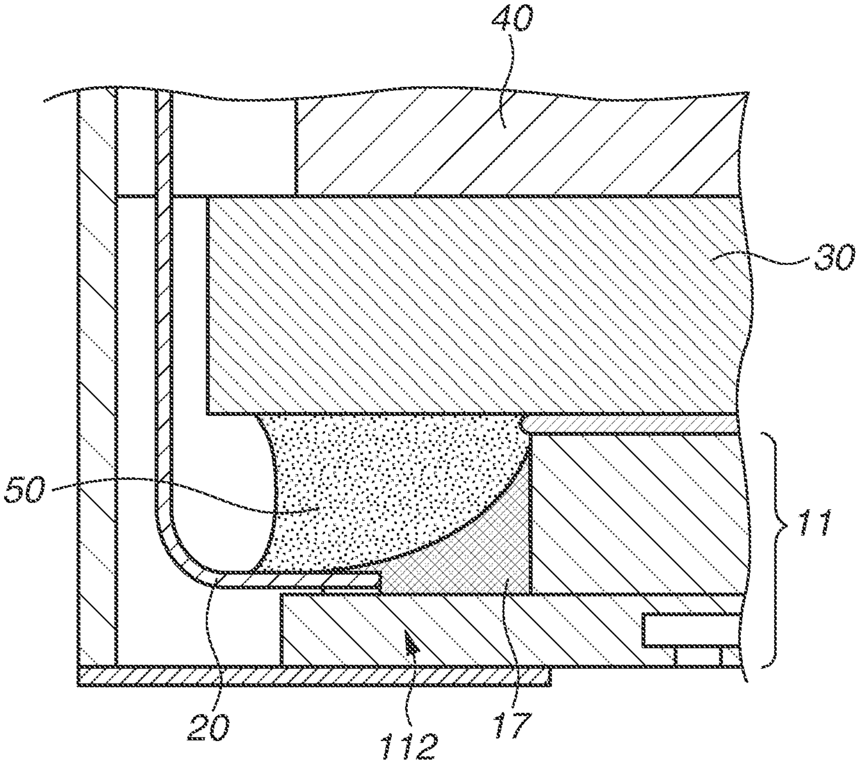

In the liquid discharging head 100 of the present disclosure, when the resin member 50 is disposed so as to be in contact with each of the second region 112, the flow path member 30, and the electric wiring member 20, an effect of improving the strength of the element substrate 11 can be obtained. Therefore, as illustrated in FIG. 7A, after the resin member 50 fills the space R surrounded by the second region 112 and the flow path member 30 at a stage before the element substrate unit 10 is fixed to the support member 40, as shown in FIG. 7B, after the resin member 50 is cured, the electric wiring member 20 can be fixed to the support member 40 while being bent. However, in this case, if a large amount of resin member 50 is disposed at a position where the electric wiring member 20 is to be bent, the electric wiring member 20 maynot be bent at the desired position due to the presence of the resin members 50, or the electric wiring member 20 may be cracked at the boundary surface between the resin member 50 and the electric wiring member 20. Therefore, it is preferable that the filling with the resin member 50 is performed after the element substrate unit 10 is fixed to the support member 40. In other words, it is preferable to perform a process of fixing the element substrate unit 10 to the support member 40 in a state where the electric wiring member 20 is bent, prior to the process of filling (disposing) with the resin member 50. As shown in FIG. 6F, the resin member 50 fills the space R in a state where the element substrate unit 10 is fixed to the support member 40, that is, in a state where the electric wiring member 20 is bent as in the case of completion of the liquid discharging head 100. Thus, the resin member 50 does not hinder the bending of the electric wiring member 20.

A liquid discharging head according to a second exemplary embodiment will be described with reference to the drawings. The same reference numerals are given to components similar to those in the first exemplary embodiment, and the description thereof will be omitted.

As illustrated in FIG. 6F, the space R is filled with the resin member 50 from a narrow gap between the flow path member 30 and the electric wiring member 20. Thus, in some cases, the space R cannot be completely filled with the resin member 50, and air bubbles may be trapped in the resin member 50. In the second exemplary embodiment of the present disclosure, the flow path member 30 has a cutout portion 31 (see FIG. 9A) for introducing the needle 51. This allows the needle 51 to be inserted close to the space to be filled with the resin member 50, and prevents air bubbles from being trapped in the space R.

Figure 8:
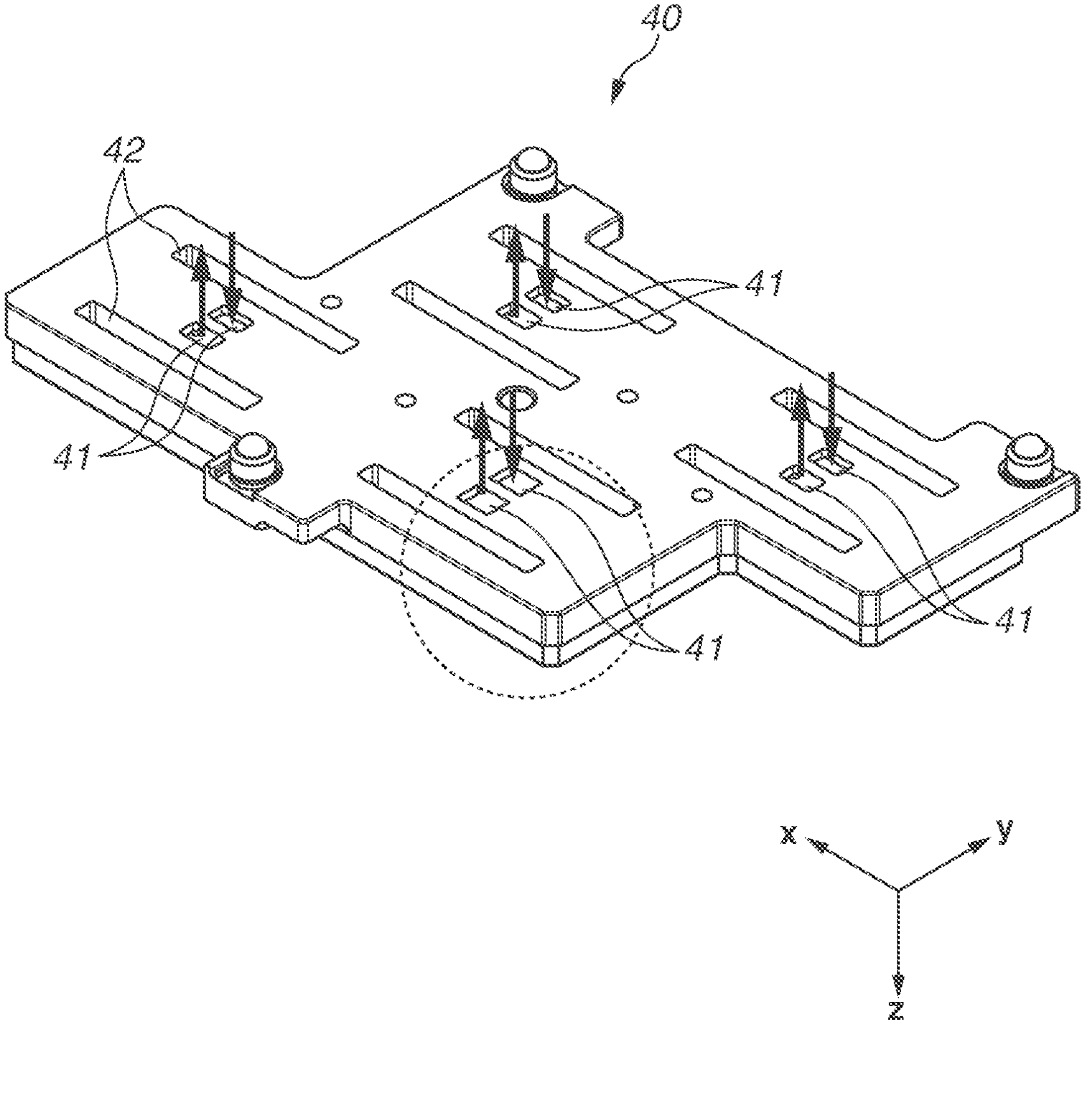
FIG. 8 is a perspective view of a support member according to the exemplary embodiments of the present disclosure.

Hereinafter, a configuration of the liquid discharging head 100 and a filling method of the resin member 50 according to the second exemplary embodiment will be described. FIG. 8 is a perspective view of the support member 40 viewed from the side (−Z direction side) opposite to the surface bonded to the element substrate unit 10. The support member 40 includes two communication ports 41 which communicate with the flow path included in the flow path member 30 and two through holes 42 through which the electric wiring member 20 penetrates when the element substrate unit 10 is fixed, for each of the element substrate units 10 to be fixed.

Figure 9A:
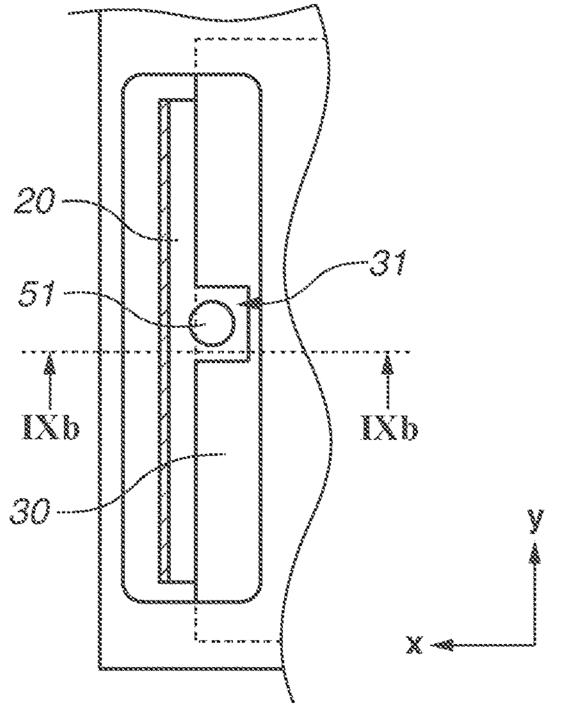
FIGS. 9A and 9B are a plan view and a cross-sectional view, respectively, illustrating a part of the manufacturing process of the liquid discharging head according to a second exemplary embodiment of the present disclosure.
Figure 9B:
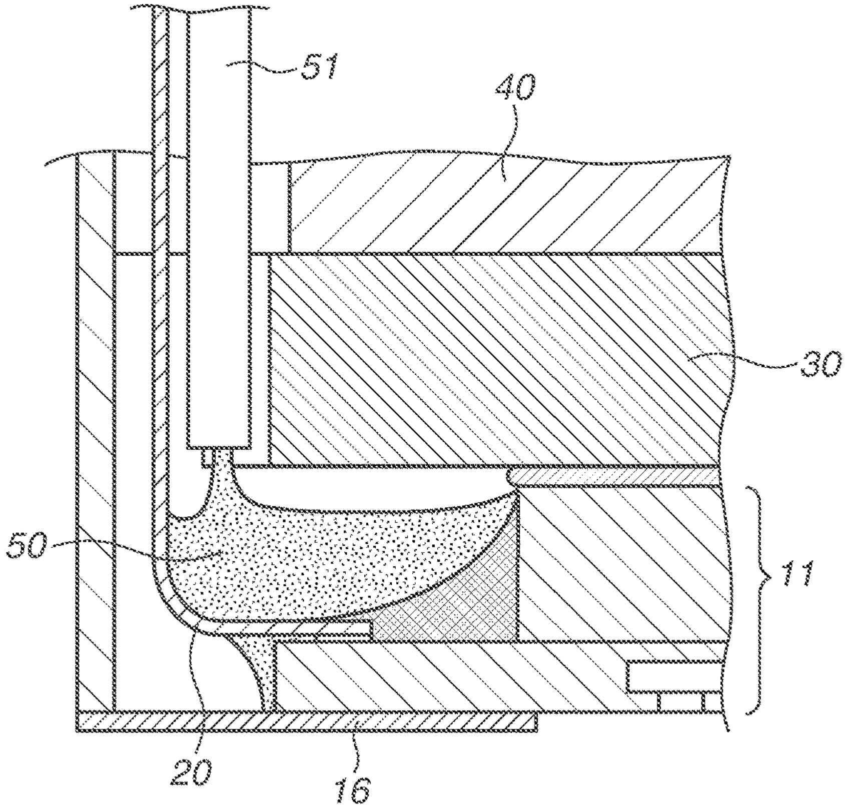

FIG. 9A is an enlarged view of the vicinity of one through hole 42 indicated by a dotted line in FIG. 8 when viewed from a direction (−Z direction side) perpendicular to the surfaces of the support member 40 and the flow path member 30, and is a plan view corresponding to the process (FIG. 6F) of attaching the element substrate unit 10 to the support member 40 and filling the space with the resin member 50. The dotted line in FIG. 9A indicates the position of the element substrate 11 which is present below the support member 40. FIG. 9B is a cross-sectional view taken along a line IXb-IXb in FIG. 9A.

As illustrated in FIGS. 9A and 9B, the flow path member 30 has one cutout portion 31 with respect to the second region 112 corresponding to one side of the element substrate 11. The needle 51 is inserted into the vicinity of the space R through the cutout portion 31, and the resin member 50 fills the space R. That is, when viewed from the direction perpendicular to the surface of the flow path member 30, the flow path member 30 has one cutout portion 31 at a center of the side overlapping the second region 112. This is preferable because the resin member 50 coming out of the needle 51 fills the space R while spreading from the center of the side having the second region 112 to both ends, and thus air bubbles are less likely to be trapped.

Figure 10:
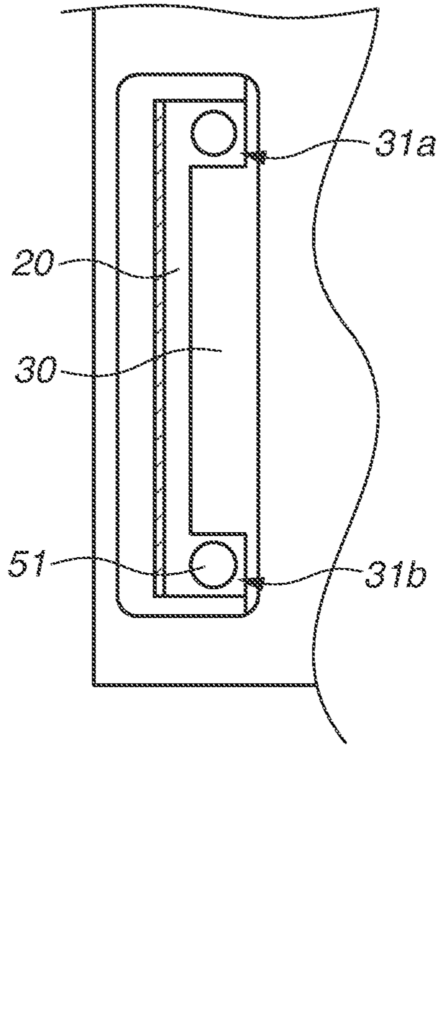
FIG. 10 is a plan view illustrating a part of the manufacturing process of the liquid discharging head according to the second exemplary embodiment of the present disclosure.
Figure 11:
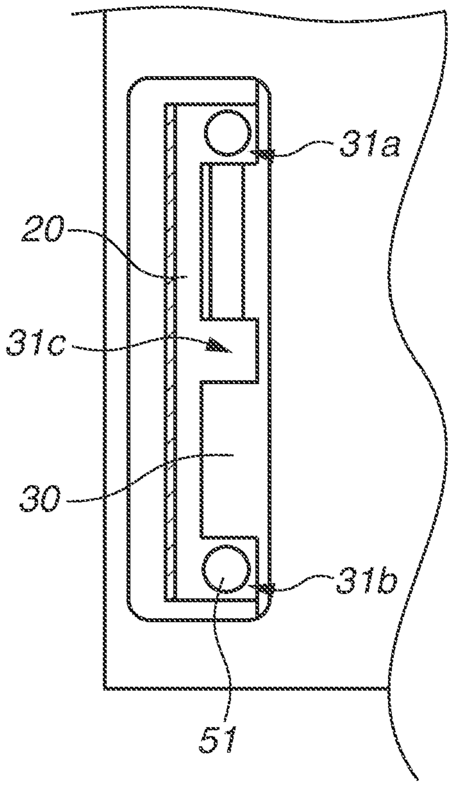
FIG. 11 is a plan view illustrating a part of the manufacturing process of the liquid discharging head according to the second exemplary embodiment of the present disclosure.

As a configuration of the cutout portion 31 of the flow path member 30, two cutout portions 31 may be provided as illustrated in FIG. 10. In this case, the resin member 50 can fill the space R simultaneously from two cutout portions 31*a* and 31*b* by using two needles 51, and the effect of shortening the time for filling can be obtained. When the filling with the resin member 50 is performed simultaneously from the two needles 51, as illustrated in FIG. 11, it is preferable to provide a cutout portion 31*c* in addition to the cutout portions 31*a* and 31*b* for inserting the needles 51. In this case, even when bubbles are trapped in the middle of the filling with the resin member 50 from both the cutout portions 31*a* and 31*b* at the same time, the cutout portion 31*c* serves to remove the bubbles, and therefore, the effect of facilitating the discharge of the bubbles can be obtained.

According to the present disclosure, it is possible to provide a liquid discharging head capable of securing strength in an electrical connection portion of an element substrate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-006236, filed Jan. 19, 2023, which is hereby incorporated by reference herein in its entirety.

What is claimed is:

1. A liquid discharging head comprising:

an element substrate including a discharge port for discharging a liquid, an energy generating element for generating energy for discharging the liquid from the discharge port, and a terminal electrically connected to the energy generating element, wherein the discharge port is provided on a first surface of the element substrate, and the terminal is provided on a second surface of the element substrate opposite to the first surface;

an electric wiring substrate connected to the terminal and configured to supply electric power for driving the energy generating element;

a first resin covering a connection portion between the terminal and an electric wiring substrate; and a support member disposed adjacent to the element substrate on the second surface, wherein, when viewed from a direction perpendicular to the second surface, the element substrate includes a first region in which the discharge port is provided and a second region which is provided along one side of the element substrate and has a thickness in a direction perpendicular to the second surface thinner than that of the first region, wherein the terminal is provided in the second region, wherein, when viewed from a direction perpendicular to the second surface, a second resin is disposed so as to be in contact with the first resin and the support member in a region overlapping the second region, and wherein the energy generating element is a piezoelectric element.

2. The liquid discharging head according to claim 1, wherein the second resin is disposed so as to be in contact also with the electric wiring substrate.

3. The liquid discharging head according to claim 1, wherein the support member includes a flow path for supplying the liquid to the element substrate.

4. The liquid discharging head according to claim 1, wherein the second resin is disposed to a height equal to or higher than a height of a bonding surface between the support member and the element substrate in a state where the first surface of the element substrate is directed vertically downward.

5. The liquid discharging head according to claim 1, further comprising a cover member bonded to the first surface of the element substrate.

6. The liquid discharging head according to claim 5, wherein the second resin further includes a region in contact with each of the electric wiring substrate, the cover member, and an end surface of the element substrate in the second region.

7. The liquid discharging head according to claim 1, wherein the electric wiring substrate is a flexible printed circuit.

8. The liquid discharging head according to claim 7, further comprising a base member that supports an element substrate unit including the element substrate, the electric wiring substrate, and the support member, wherein the element substrate unit is fixed to the base member in a state where the electric wiring substrate is bent.

9. The liquid discharging head according to claim 1, wherein the first resin is a sealing material and contains an epoxy resin.

10. The liquid discharging head according to claim 1, wherein the second resin contains a silicone resin.

11. The liquid discharging head according to claim 1, wherein the element substrate has a structure in which a plurality of substrates is stacked.

12. The liquid discharging head according to claim 1, wherein the support member is made of alumina.

13. The liquid discharging head according to claim 1, wherein the support member has a cutout at a position overlapping the second region when viewed from a direction perpendicular to the first surface.

14. A liquid discharging head comprising:

an element substrate including a discharge port for discharging a liquid, an energy generating element for generating energy for discharging the liquid from the discharge port, and a terminal electrically connected to the energy generating element, wherein the discharge port is provided on a first surface of the element substrate, and the terminal is provided on a second surface of the element substrate opposite to the first surface;

an electric wiring substrate connected to the terminal and configured to supply electric power for driving the energy generating element; and a support member disposed adjacent to the element substrate on the second surface, wherein a distance from the first surface to the support member is constant in a direction perpendicular to the second surface in a region facing the element substrate, wherein, when viewed from a direction perpendicular to the second surface, the element substrate includes a first region in which the discharge port is provided and a second region which is provided along one side of the element substrate and has a thickness in a direction perpendicular to the second surface thinner than that of the first region, wherein the terminal is provided in the second region, wherein, when viewed from a direction perpendicular to the second surface, a resin member is disposed so as to be in contact with the terminal and the support member in a region overlapping the second region, and wherein the energy generating element is a piezoelectric element.

15. A method for manufacturing a liquid discharging head, wherein the liquid discharging head includes:

an element substrate that has a discharge port for discharging a liquid, an energy generating element for generating energy for discharging the liquid from the discharge port, and a terminal electrically connected to the energy generating element, wherein the discharge port is provided on a first surface of the element substrate, and the terminal is provided on a second surface of the element substrate opposite to the first surface, an electric wiring substrate connected to the terminal, wherein the electric wiring substrate supplies electric power for driving the energy generating element to the energy generating element, a first resin covering a connection portion between the terminal and the electric wiring substrate, and a support member disposed adjacent to the second surface of the element substrate, wherein, when viewed from a direction perpendicular to the second surface, the element substrate includes a first region in which the discharge port is provided and a second region which is provided along one side of the element substrate and has a thickness on a second surface side in a direction perpendicular to the second surface thinner than that of the first region, wherein the terminal is provided in the second region, and wherein the energy generating element is a piezoelectric element, the method comprising:

preparing the element substrate;

connecting the electric wiring substrate and the terminal, and covering the connection portion with the first resin;

bonding the support member to the second surface of the element substrate; and disposing, when viewed from a direction perpendicular to the second surface, a second resin in contact with the first resin and a region of the support member facing the second region in a region overlapping the second region.

16. The method according to claim 15, further comprising curing the disposed second resin.

17. The method according to claim 15, wherein the electric wiring substrate is a flexible printed circuit.

18. The method according to claim 15, wherein the second resin is a moisture-curable resin.

19. The method according to claim 15, further comprising, prior to covering the connection portion with the first resin, fixing an element substrate unit including the element substrate, the electric wiring substrate, and the support member to a base member in a state where the electric wiring substrate is bent.

* * * * *